(12) United States Patent
Chang (10) Patent No.: US 7,661,492 B1
(45) Date of Patent: Feb. 16, 2010

(54) MOTORIZED WHEELED VEHICLE HAVING A MULTI-STAGE SPEED REDUCTION FUNCTION WHEN TURNING

(75) Inventor: Feng-Chu Chang, Hsin Chang (TW)

(73) Assignee: Chienti Enterprise Co., Ltd., Taipei Hsien (TW)

( * ) Notice: Subject to any disclaimer, the term of this patent is extended or adjusted under 35 U.S.C. 154(b) by 0 days.

(21) Appl. No.: 12/343,795

(22) Filed: Dec. 24, 2008

(51) Int. Cl.
*B62D 11/00* (2006.01)
*B62D 11/02* (2006.01)

(52) U.S. Cl. .................... 180/6.58; 180/19.3; 180/65.2; 180/332; 180/333

(58) Field of Classification Search ................ 180/6.54, 180/6.58, 6.6, 19.3, 65.2, 211, 218, 78, 332, 180/333; 280/62, 63
See application file for complete search history.

(56) References Cited

U.S. PATENT DOCUMENTS

| | | | |
|---|---|---|---|
| 5,947,222 A * | 9/1999 | Yamaoka et al. ............ | 180/210 |
| 7,172,041 B2 * | 2/2007 | Wuertz et al. .............. | 180/6.24 |
| 7,478,689 B1 * | 1/2009 | Sugden et al. ............. | 180/19.3 |
| 2006/0118350 A1 * | 6/2006 | Suyama et al. .............. | 180/332 |
| 2006/0207822 A1 * | 9/2006 | Taylor ........................ | 180/326 |
| 2007/0045022 A1 * | 3/2007 | Greig et al. ................. | 180/215 |
| 2009/0078485 A1 * | 3/2009 | Gutsch et al. ............... | 180/218 |

* cited by examiner

*Primary Examiner*—Toan C To
(74) *Attorney, Agent, or Firm*—Alan Kamrath; Kamrath & Associates PA (57) ABSTRACT

A motorized wheeled vehicle includes a support frame, a head tube secured on the support frame, a front fork pivotally mounted on the head tube, a front wheel rotatably mounted on the front fork, a steering tube pivotally mounted on the head tube and secured on the front fork, a speed reduction control switch mounted on the head tube and provided with a plurality of contact points, and a contact board mounted on the steering tube and movable relative to the speed reduction control switch to press or detach the contact points of the speed reduction control switch. Thus, the speed reduction control switch has a multi-stage and micro-adjustment speed reduction function so as to reduce the speed of the motorized wheeled vehicle gradually when the motorized wheeled vehicle is turned.

17 Claims, 9 Drawing Sheets

MOTORIZED WHEELED VEHICLE HAVING A MULTI-STAGE SPEED REDUCTION FUNCTION WHEN TURNING

BACKGROUND OF THE INVENTION

1. Field of the Invention

The present invention relates to a wheeled vehicle and, more particularly, to a motorized wheeled vehicle, such as a motorized bicycle, an automotive vehicle and the like.

2. Description of the Related Art

A conventional motorized wheeled vehicle comprises a turning reduction gear that is operated to slightly reduce the speed of the motorized wheeled vehicle when the motorized wheeled vehicle is turned around so as to prevent the motorized wheeled vehicle from being upset or fall down due to an excessive speed. However, the turning reduction gear only has a single-stage speed reduction function when turning, so that the speed of the motorized wheeled vehicle cannot be reduced efficiently when the motorized wheeled vehicle is turned around.

BRIEF SUMMARY OF THE INVENTION

In accordance with the present invention, there is provided a motorized wheeled vehicle, comprising a support frame, a head tube secured on the support frame, a front fork pivotally mounted on the head tube, a front wheel rotatably mounted on the front fork, a steering tube pivotally mounted on the head tube and secured on the front fork to drive the front fork to pivot relative to the head tube, a speed reduction control switch mounted on the head tube and provided with a plurality of contact points, and a contact board mounted on the steering tube to move in concert with the steering tube and movable relative to the speed reduction control switch to press or detach the contact points of the speed reduction control switch.

The primary objective of the present invention is to provide a motorized wheeled vehicle having a multi-stage speed reduction function when turning.

Another objective of the present invention is to provide a motorized wheeled vehicle, wherein the speed reduction control switch has a multi-stage and micro-adjustment speed reduction function to reduce the speed of the motorized wheeled vehicle gradually and successively when the motorized wheeled vehicle is turned so as to prevent the speed of the motorized wheeled vehicle from being too high when the motorized wheeled vehicle is turned around so as to protect the rider's safety.

A further objective of the present invention is to provide a motorized wheeled vehicle, wherein when the turning angle of the motorized wheeled vehicle is increased, the speed of the motorized wheeled vehicle is also decreased by co-operation of the contact board with the speed reduction control switch, so that the rider can manipulate the motorized wheeled vehicle easily and conveniently when the motorized wheeled vehicle is turned around.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-5, a motorized wheeled vehicle in accordance with the preferred embodiment of the present invention comprises a support frame 1, a head tube 10 secured on the support frame 1, a front fork 12 pivotally mounted on the head tube 10, a front wheel 13 rotatably mounted on the front fork 12, a steering tube 14 pivotally mounted on the head tube 10 and secured on the front fork 12 to drive the front fork 12 to pivot relative to the head tube 10, a stem 20 secured on the steering tube 14 to drive the steering tube 14 to pivot relative to the head tube 10, a speed reduction control switch 24 mounted on the head tube 10 and provided with a plurality of contact points 241, and a contact board 23 mounted on the steering tube 14 to move in concert with the steering tube 14 and movable relative to the speed reduction control switch 24 to press or detach the contact points 241 of the speed reduction control switch 24.

Figure 4:
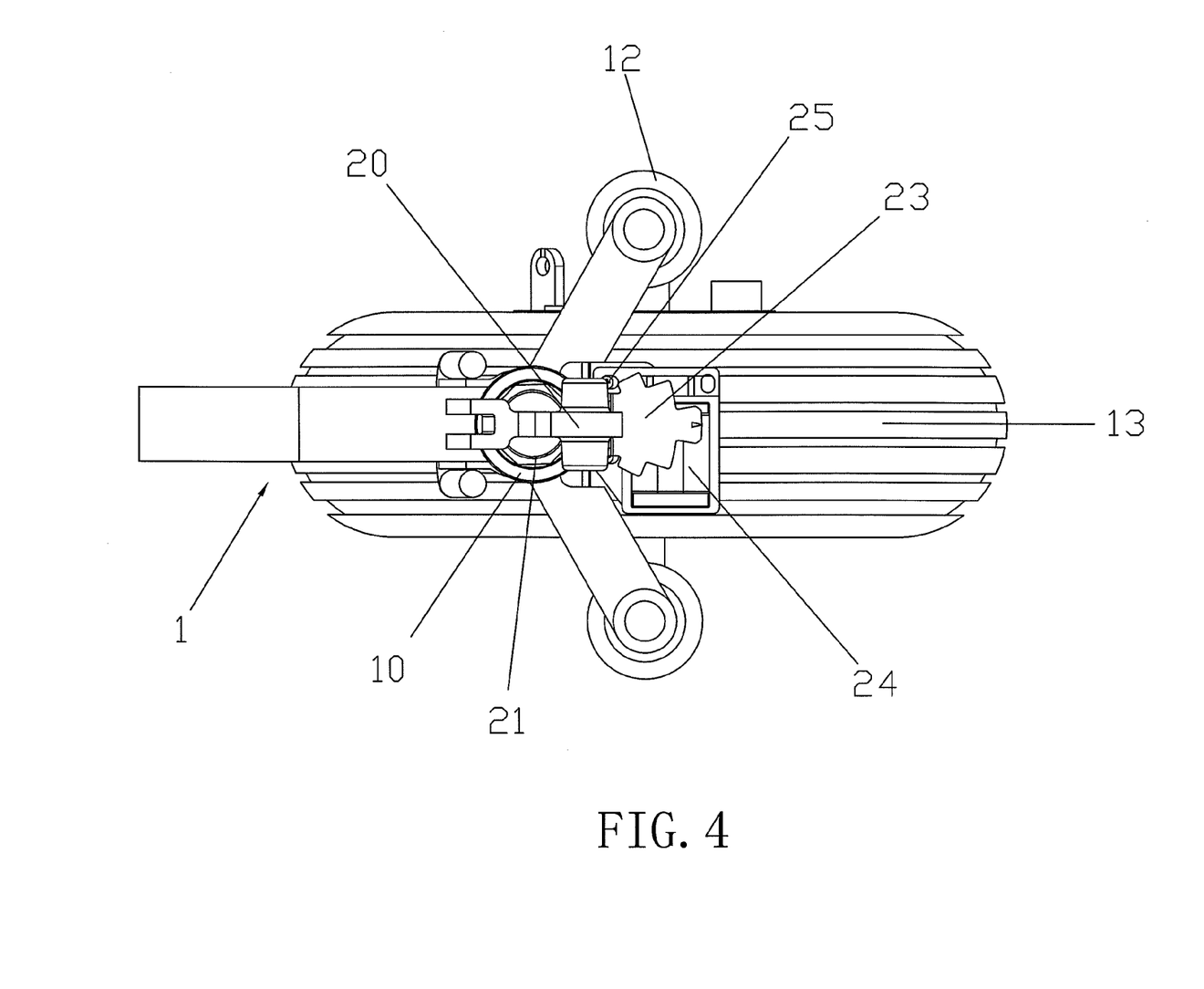
FIG. 4 is a top view of the motorized wheeled vehicle as shown in FIG. 1.
Figure 5:
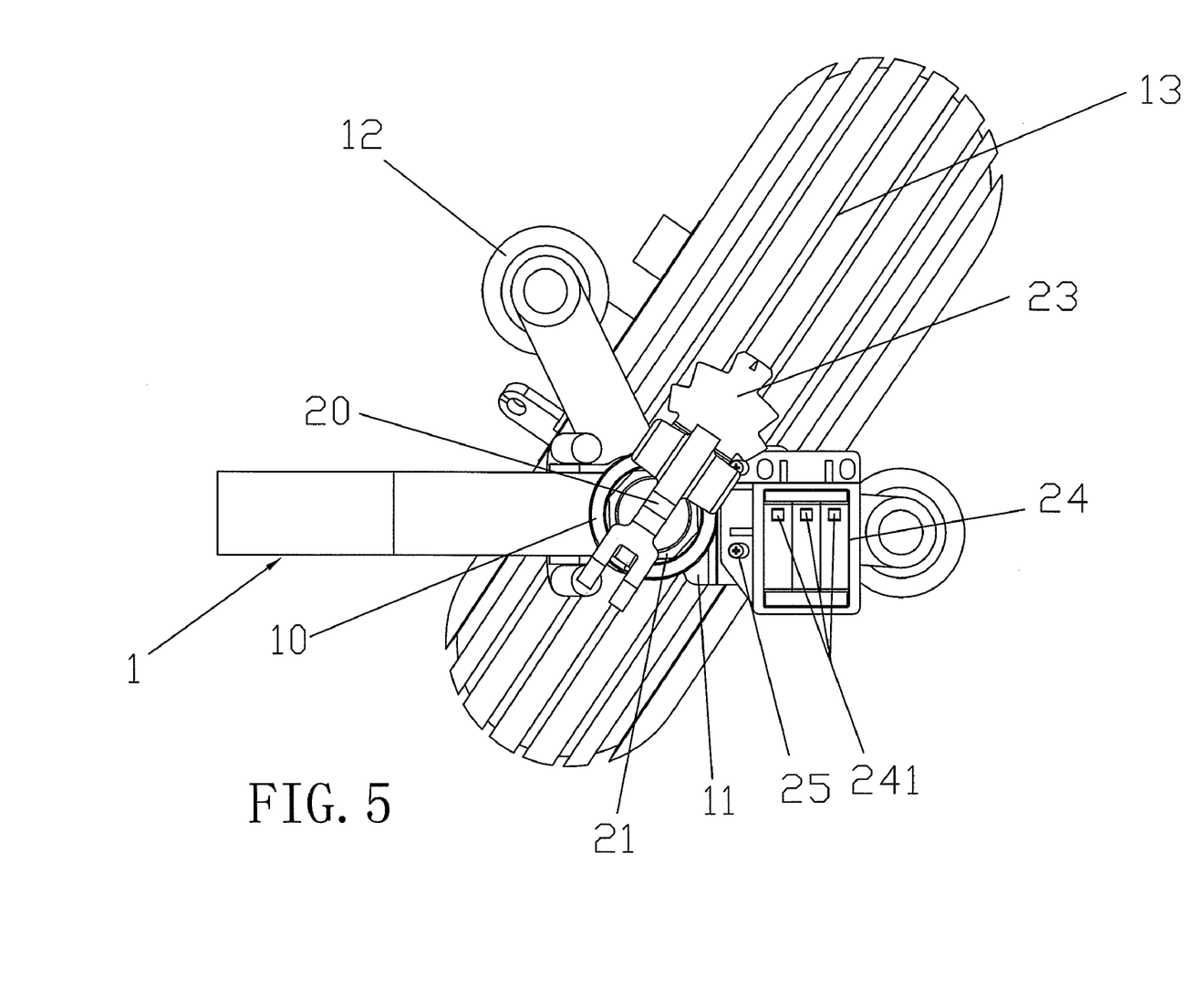
FIG. 5 is a schematic operational view of the motorized wheeled vehicle as shown in FIG. 4.

In the preferred embodiment of the present invention, the speed reduction control switch 24 is a microswitch. The steering tube 14 is connected with a handlebar (not shown). The steering tube 14 extends through the head tube 10 and has a lower end secured on the front fork 12 and an upper end protruding from the head tube 10 for mounting the stem 20. The contact board 23 is in line with the front wheel 13 constantly. The contact board 23 is located above the speed reduction control switch 24 and presses all of the contact points 241 of the speed reduction control switch 24 at a normal state as shown in FIG. 4. On the contrary, when the steering tube 14 is turned relative to the head tube 10, the contact board 23 is moved relative to the speed reduction control switch 24 to detach from one, some or all of the contact points 241 of the speed reduction control switch 24 as shown in FIG. 5.

Figure 1:
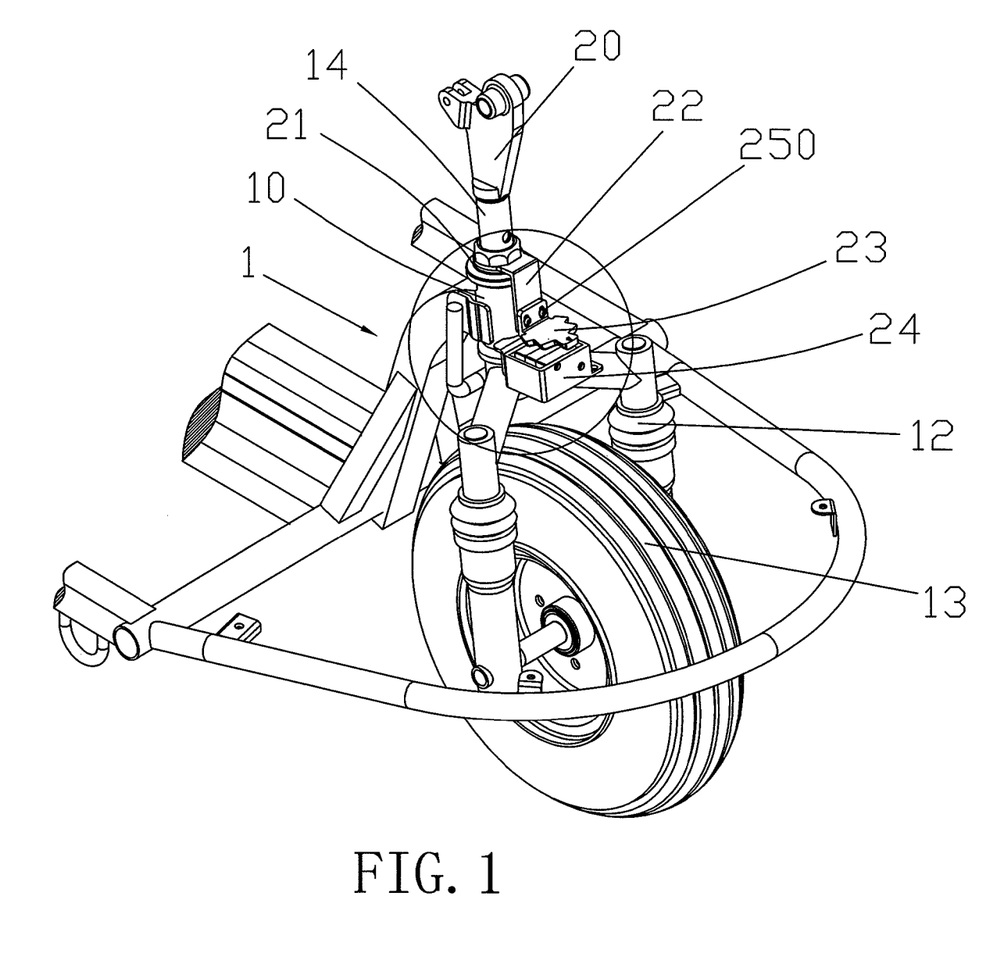
FIG. 1 is a perspective view of a motorized wheeled vehicle in accordance with the preferred embodiment of the present invention.
Figure 2:
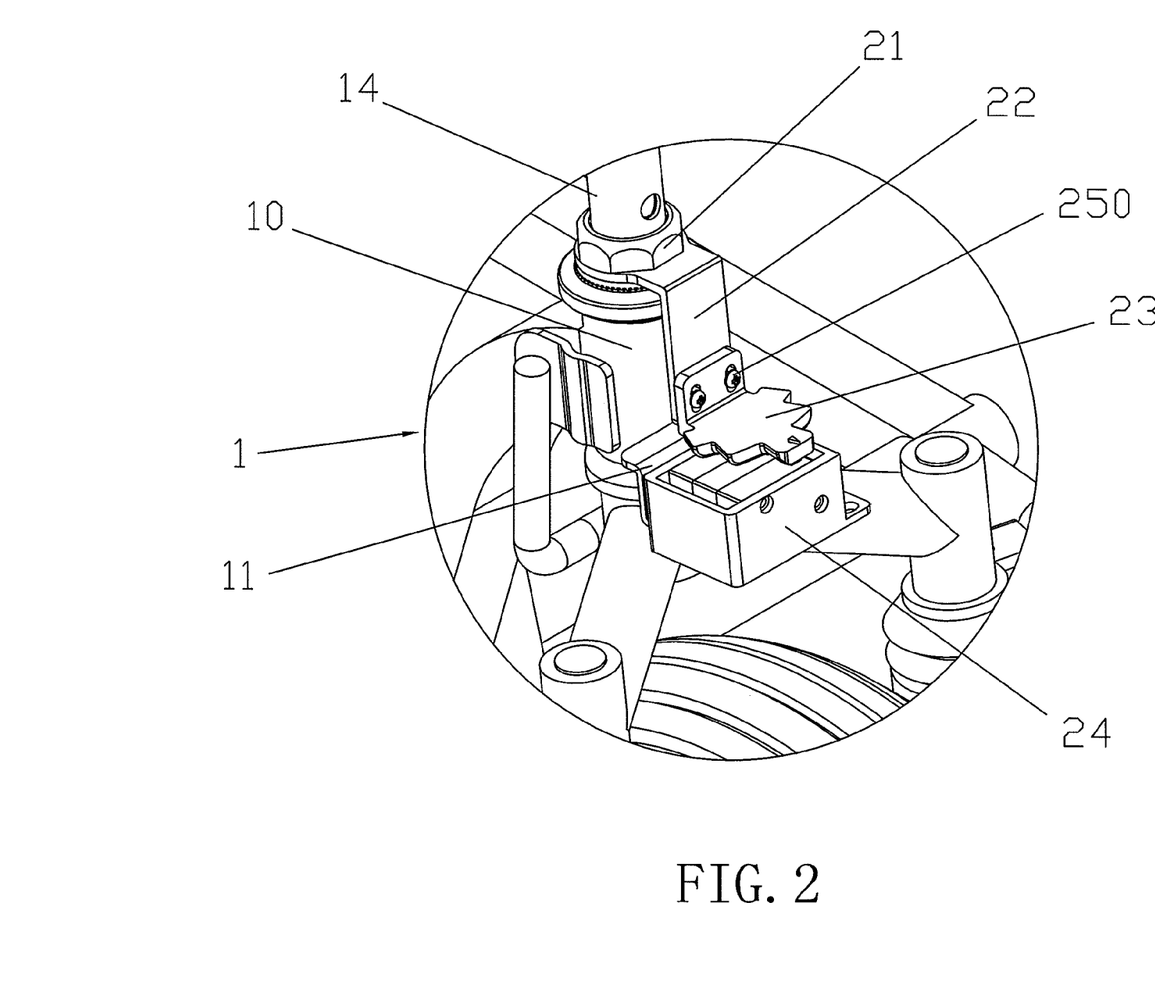
FIG. 2 is a locally enlarged view of the motorized wheeled vehicle as shown in FIG. 1.
Figure 3:
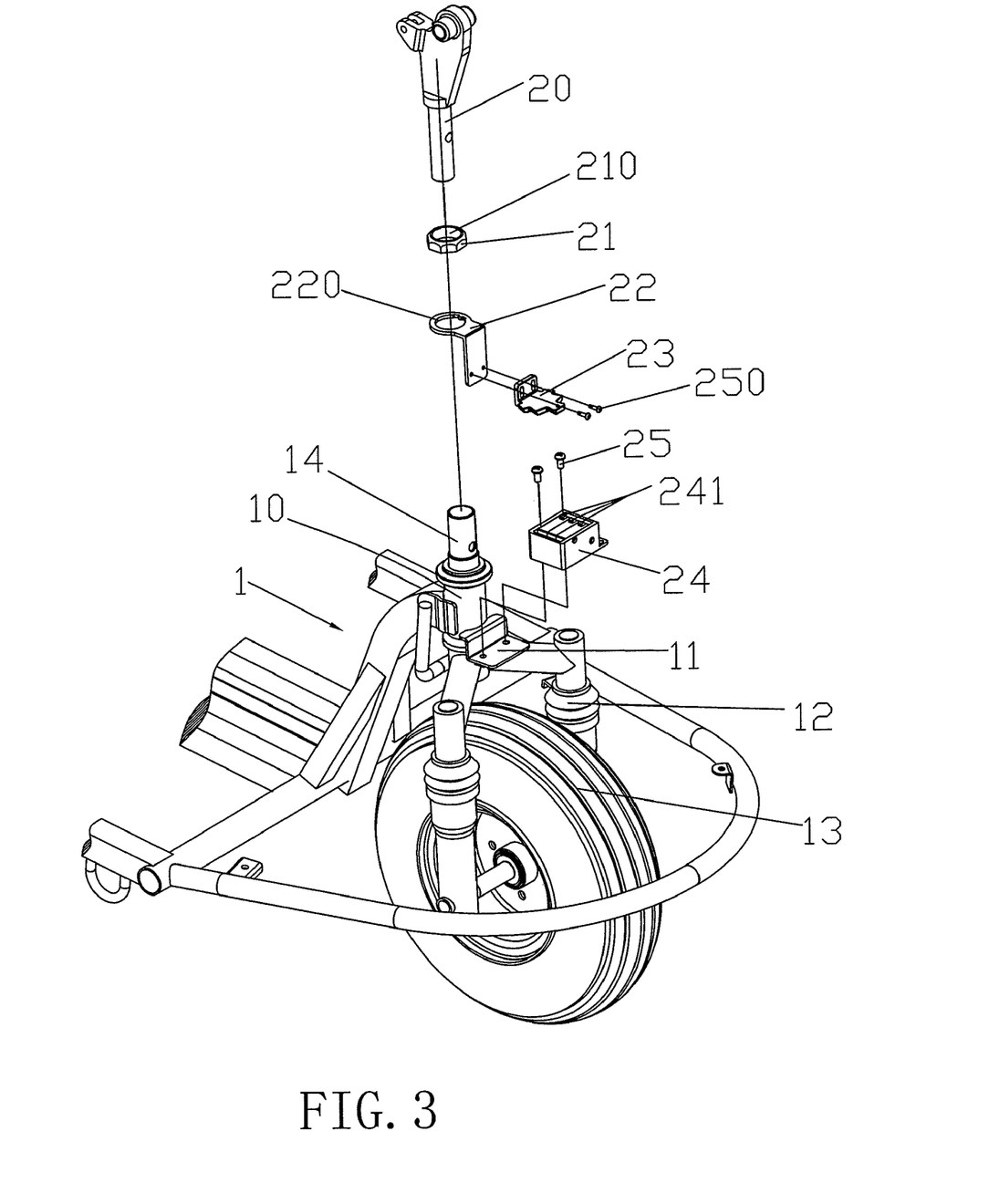
FIG. 3 is a partially exploded perspective view of the motorized wheeled vehicle as shown in FIG. 1.

The motorized wheeled vehicle further comprises a mounting bracket 11 secured on the head tube 10 for mounting the speed reduction control switch 24, and a fixing bracket 22 secured on the steering tube 14 for fixing the contact board 23. The speed reduction control switch 24 is secured on the mounting bracket 11 by a plurality of locking screws 25. The fixing bracket 22 is secured on the steering tube 14 by a locking nut 21. The contact board 23 is secured on the fixing bracket 22 by a plurality of fastening screws 250.

The stem 20 has a lower end inserted into the steering tube 14. The locking nut 21 is provided with a through hole 210 to allow passage of the steering tube 14. The fixing bracket 22 is provided with a through bore 220 to allow passage of the steering tube 14. The locking nut 21 and the fixing bracket 22 are located between the head tube 10 and the stem 20. The steering tube 14 functions as a pivot fulcrum of the fixing bracket 22 and the contact board 23 so that the contact board 23 is pivoted about the steering tube 14 to pivot relative to the head tube 10 and to cover the speed reduction control switch 24 as shown in FIG. 4 or detach from the speed reduction control switch 24 as shown in FIG. 5.

In practice, the speed reduction control switch 24 is connected to a main controller (not shown) to perform a speed reduction action. Thus, when the contact board 23 presses all of the contact points 241 of the speed reduction control switch 24 at a normal state as shown in FIG. 4, the main controller is not operated, so that the speed of the motorized wheeled vehicle is not reduced. When the contact board 23 is moved relative to the speed reduction control switch 24 to detach from one of the contact points 241 of the speed reduction control switch 24, the main controller is operated to perform a first-stage speed reduction action, so that the speed of the motorized wheeled vehicle is reduced slightly. When the contact board 23 is further moved relative to the speed reduction control switch 24 to detach from two of the contact points 241 of the speed reduction control switch 24, the main controller is operated to perform a second-stage speed reduction action, so that the speed of the motorized wheeled vehicle is reduced further. When the contact board 23 is further moved relative to the speed reduction control switch 24 to detach from three of the contact points 241 of the speed reduction control switch 24, the main controller is operated to perform a third-stage speed reduction action, so that the speed of the motorized wheeled vehicle is reduced further. The above-mentioned procedures are repeated successively. Finally, when the contact board 23 is further moved relative to the speed reduction control switch 24 to detach from all of the contact points 241 of the speed reduction control switch 24 as shown in FIG. 5, the main controller is operated to perform a last-stage speed reduction action, so that the speed of the motorized wheeled vehicle is reduced further.

Thus, the contact board 23 is moved relative to the speed reduction control switch 24 to detach from one, some or all of the contact points 241 of the speed reduction control switch 24 to perform a multi-stage speed reduction action in a micro-adjustment manner, so that the speed of the motorized wheeled vehicle is reduced in a multi-stage and micro-adjustment manner.

Figure 6:
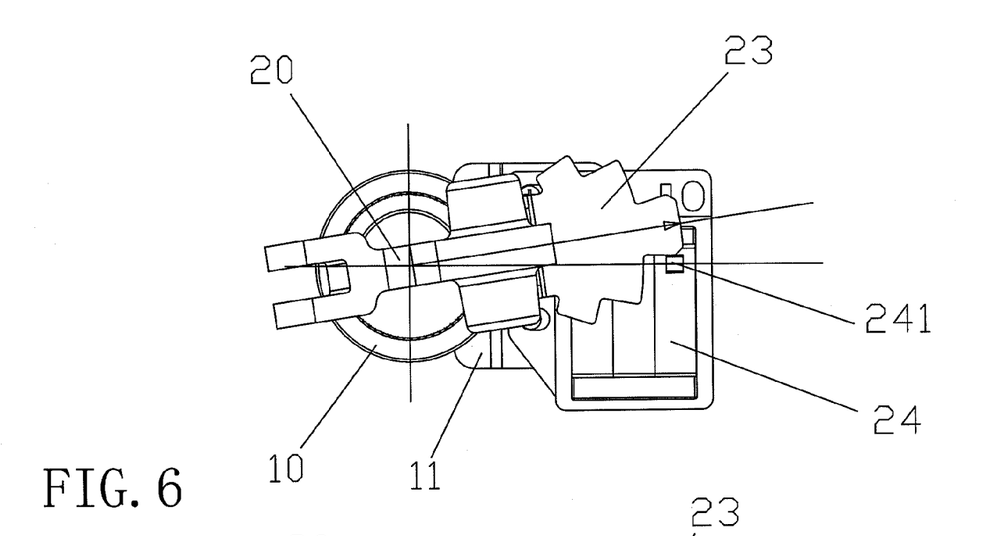
FIG. 6 is a schematic operational view of the motorized wheeled vehicle as shown in FIG. 4.
Figure 7:
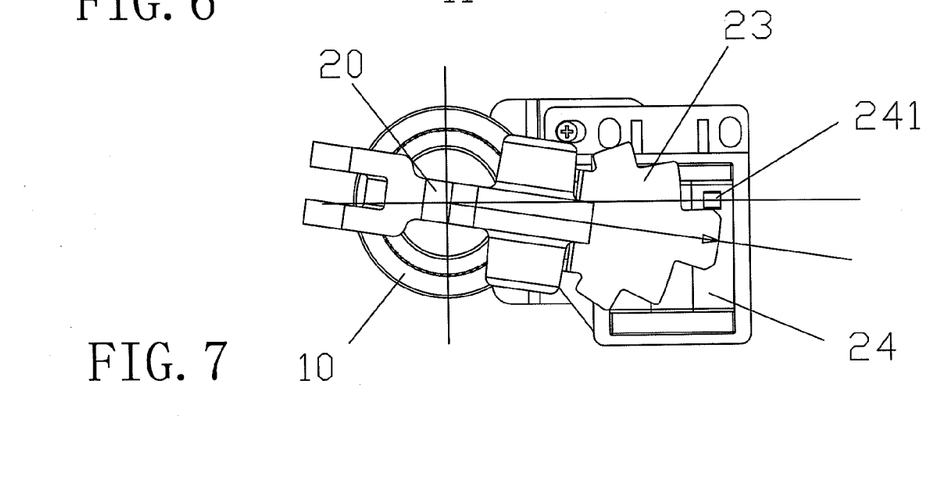
FIG. 7 is a schematic operational view of the motorized wheeled vehicle as shown in FIG. 4.
Figure 8:
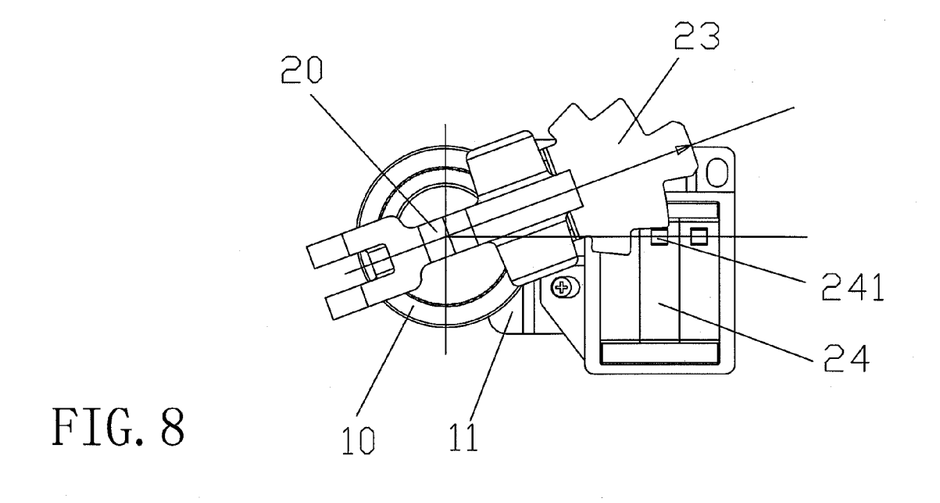
FIG. 8 is a schematic operational view of the motorized wheeled vehicle as shown in FIG. 6.
Figure 9:
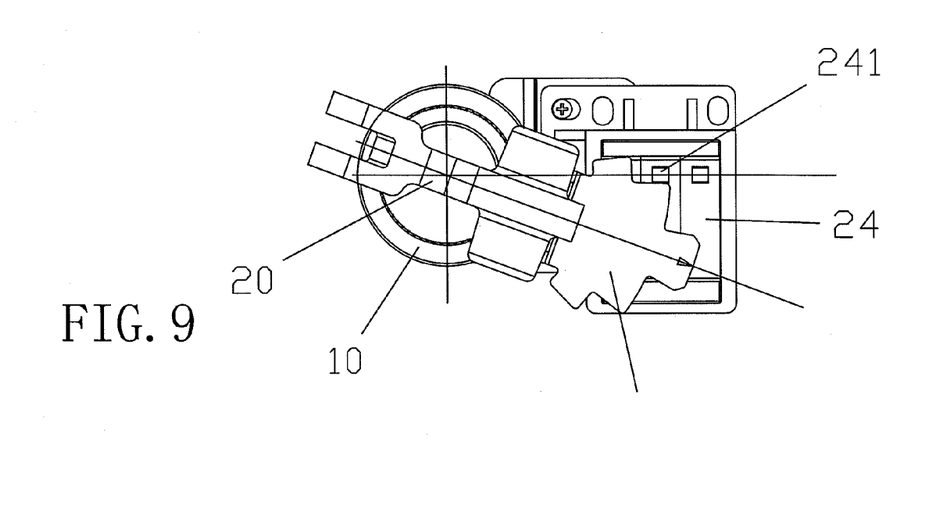
FIG. 9 is a schematic operational view of the motorized wheeled vehicle as shown in FIG. 7.
Figures 10, 11:
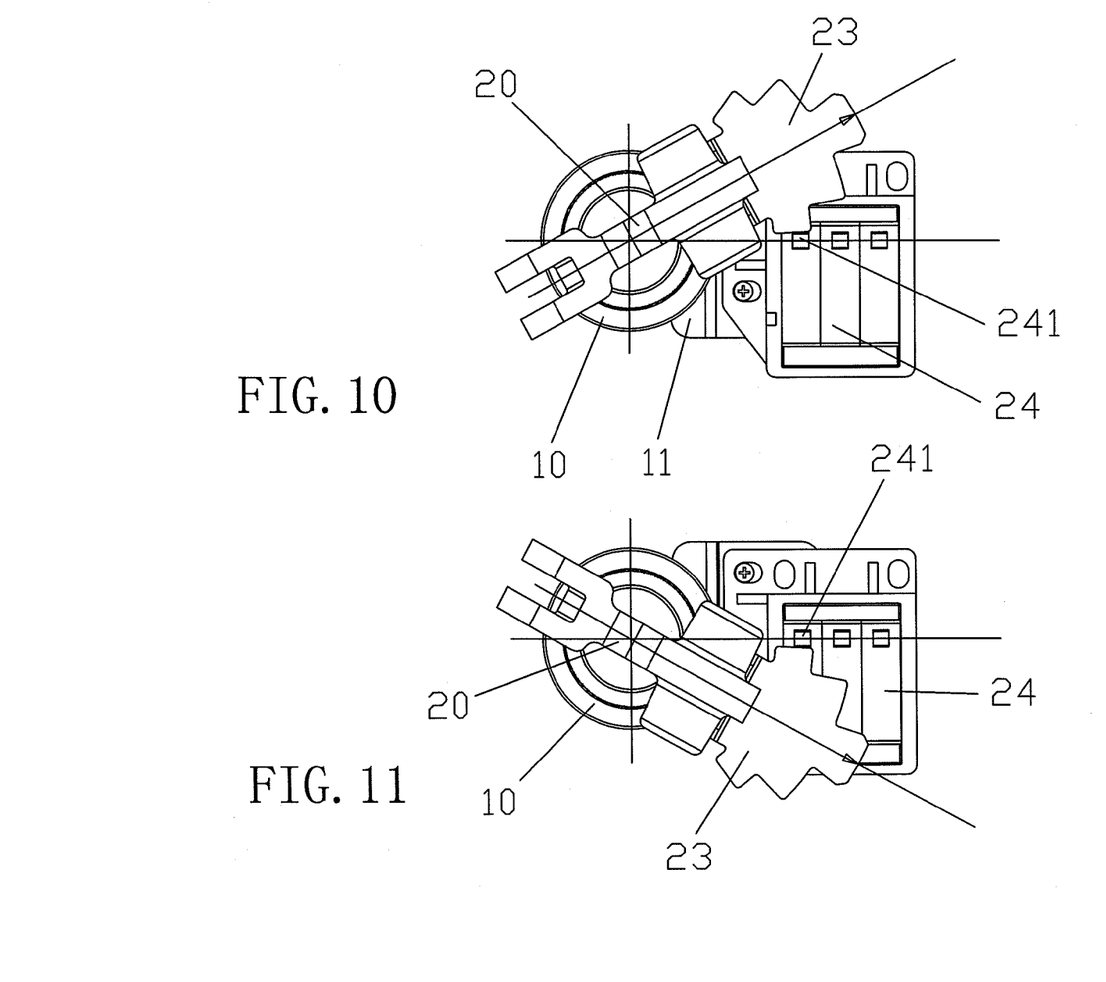
FIG. 10 is a schematic operational view of the motorized wheeled vehicle as shown in FIG. 8.
FIG. 11 is a schematic operational view of the motorized wheeled vehicle as shown in FIG. 9.

In operation, referring to FIGS. 6-11 with reference to FIGS. 1-5, when the front wheel 13 is traveled forward straightly, the contact board 23 presses all of the contact points 241 of the speed reduction control switch 24 as shown in FIG. 4, so that the main controller is not operated, and the speed of the motorized wheeled vehicle is not reduced. When the front wheel 13 (or the stem 20) is turned leftward or rightward, the contact board 23 is also turned leftward or rightward to detach from one of the contact points 241 of the speed reduction control switch 24 as shown in FIGS. 6 and 7, so that the main controller is operated to perform a first-stage speed reduction action, and the speed of the motorized wheeled vehicle is reduced slightly. When the front wheel 13 (or the stem 20) is further turned leftward or rightward, the contact board 23 is further turned leftward or rightward to detach from two of the contact points 241 of the speed reduction control switch 24 as shown in FIGS. 8 and 9, so that the main controller is operated to perform a second-stage speed reduction action, and the speed of the motorized wheeled vehicle is reduced further. When the front wheel 13 (or the stem 20) is further turned leftward or rightward, the contact board 23 is further turned leftward or rightward to detach from three of the contact points 241 of the speed reduction control switch 24 as shown in FIGS. 10 and 11, so that the main controller is operated to perform a third-stage speed reduction action, and the speed of the motorized wheeled vehicle is reduced further.

Thus, when the front wheel 13 (or the stem 20) is turned leftward or rightward, the contact board 23 is moved relative to the speed reduction control switch 24 to detach from one, some or all of the contact points 241 of the speed reduction control switch 24 to perform a multi-stage speed reduction action in a micro-adjustment manner, so that the speed of the motorized wheeled vehicle is reduced in a multi-stage and micro-adjustment manner to prevent the speed of the motorized wheeled vehicle from being too high when the motorized wheeled vehicle is turned around so as to protect the rider's safety.

Figure 12:
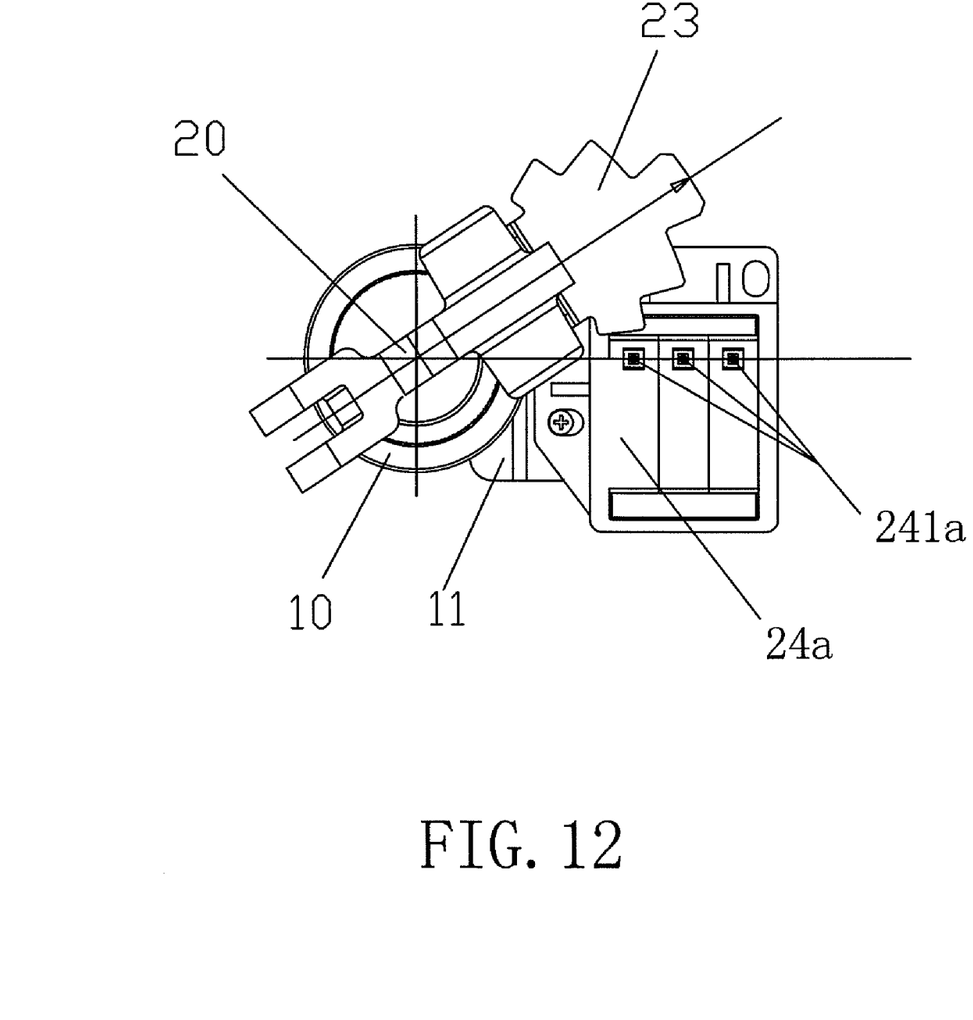
FIG. 12 is a partially top operational view of a motorized wheeled vehicle in accordance with another preferred embodiment of the present invention.

As shown in FIG. 12, the speed reduction control switch 24a is a photoelectric switch and is provided with a plurality of contact points 241a.

Accordingly, the speed reduction control switch 24 has a multi-stage and micro-adjustment speed reduction function to reduce the speed of the motorized wheeled vehicle gradually and successively when the motorized wheeled vehicle is turned so as to prevent the speed of the motorized wheeled vehicle from being too high when the motorized wheeled vehicle is turned around so as to protect the rider's safety. In addition, when the turning angle of the motorized wheeled vehicle is increased, the speed of the motorized wheeled vehicle is also decreased by co-operation of the contact board 23 with the speed reduction control switch 24, so that the rider can manipulate the motorized wheeled vehicle easily and conveniently when the motorized wheeled vehicle is turned around.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A motorized wheeled vehicle, comprising:
   a support frame;
   a head tube secured on the support frame;
   a front fork pivotally mounted on the head tube;
   a front wheel rotatably mounted on the front fork;
   a steering tube pivotally mounted on the head tube and secured on the front fork to drive the front fork to pivot relative to the head tube;
   a speed reduction control switch mounted on the head tube and provided with a plurality of contact points;
   a contact board mounted on the steering tube to move in concert with the steering tube and movable relative to the speed reduction control switch to press or detach the contact points of the speed reduction control switch.

2. The motorized wheeled vehicle of claim 1, further comprising:
   a mounting bracket secured on the head tube for mounting the speed reduction control switch.

3. The motorized wheeled vehicle of claim 2, further comprising:
   a fixing bracket secured on the steering tube for fixing the contact board.

4. The motorized wheeled vehicle of claim 2, wherein the speed reduction control switch is secured on the mounting bracket by a plurality of locking screws.

5. The motorized wheeled vehicle of claim 3, wherein the contact board is secured on the fixing bracket by a plurality of fastening screws.

6. The motorized wheeled vehicle of claim 3, wherein the fixing bracket is secured on the steering tube by a locking nut.

7. The motorized wheeled vehicle of claim 6, further comprising:
- a stem secured on the steering tube to drive the steering tube to pivot relative to the head tube;
- wherein the stem has a lower end inserted into the steering tube.

8. The motorized wheeled vehicle of claim 6, wherein the locking nut is provided with a through hole to allow passage of the steering tube.

9. The motorized wheeled vehicle of claim 7, wherein the locking nut and the fixing bracket are located between the head tube and the stem.

10. The motorized wheeled vehicle of claim 3, wherein the fixing bracket is provided with a through bore to allow passage of the steering tube.

11. The motorized wheeled vehicle of claim 3, wherein the steering tube functions as a pivot fulcrum of the fixing bracket and the contact board so that the contact board is pivoted about the steering tube to pivot relative to the head tube and to cover the speed reduction control switch or detach from the speed reduction control switch.

12. The motorized wheeled vehicle of claim 1, wherein the speed reduction control switch is a microswitch.

13. The motorized wheeled vehicle of claim 1, wherein the speed reduction control switch is a photoelectric switch.

14. The motorized wheeled vehicle of claim 1, wherein the contact board is in line with the front wheel constantly.

15. The motorized wheeled vehicle of claim 1, wherein the contact board is located above the speed reduction control switch and presses all of the contact points of the speed reduction control switch at a normal state.

16. The motorized wheeled vehicle of claim 7, wherein the steering tube extends through the head tube and has a lower end secured on the front fork and an upper end protruding from the head tube for mounting the stem.

17. The motorized wheeled vehicle of claim 16, wherein when the steering tube is turned relative to the head tube, the contact board is movable relative to the speed reduction control switch to detach from one, some or all of the contact points of the speed reduction control switch.

* * * * *